8397X
J. DENNIS.
MILK CAN SHOE.
Patented Sept. 8, 1834.
*Underside.*
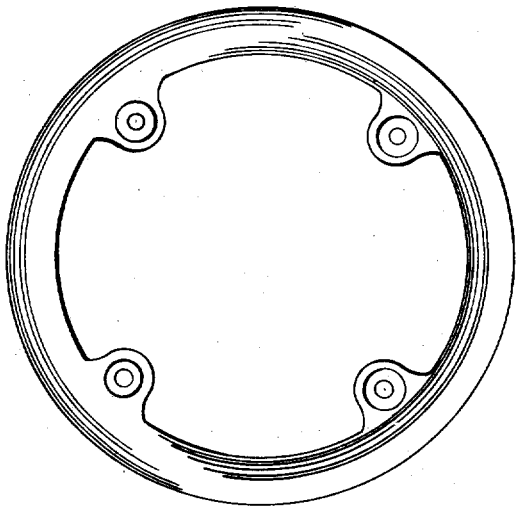
*Upperside.*
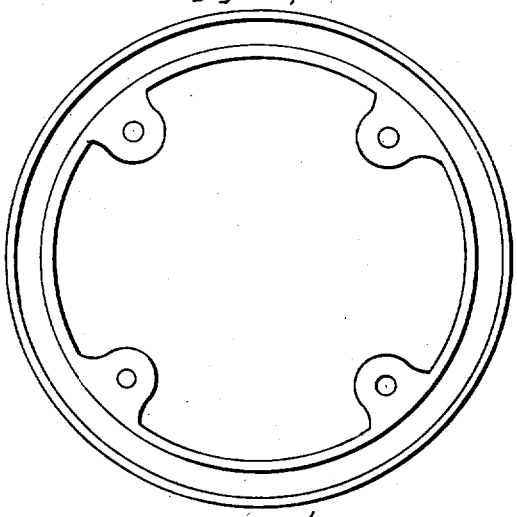
*Section*
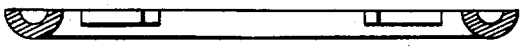
THE NORRIS PETERS CO., PHOTO-LITHO., WASHINGTON, D. C.

Sept. 8. 1834   av 13

8897X

James Dennis
Letters Patent (Sept. 8. 1834)

The Schedule referred to in these Letters Patent and making part of the same containing a description in the words of the said James Dennis himself of his improvement in a Shell can Shoe

---

To all to whom these presents shall come: Be it known that I James Dennis of Providence in the State of Rhode Island have invented a new and useful improvement in a "Shell Can Shoe" and that the following is a full and exact description of the same as invented or improved by me viz.

The Shell can shoe is made of cast or wrought iron or other metal and is intended to be attached to the bottoms of shell cans to protect them and the floors where they are used from wear or injury.

The shoe is a circular ring about one half of an inch or more in width having either a convex concave or convex plane form. It has a thin flanch or three or more ears projecting from its inner edge by which it may be fastened to a can with screws or otherwise. The subscriber claims as his invention the plan of shoeing shell cans with cast or wrought iron or other metal and the form of the shoe above described Providence R.I. July 26th 1834.

Witnesses
[illegible] Jackson
[illegible]

James Dennis

Drawing (Granted September 8. 1834)